(12) United States Patent
Kalyanasundaram et al.

(10) Patent No.: US 12,143,183 B2
(45) Date of Patent: Nov. 12, 2024

(54) BEAM AND ANTENNA ARRAY SPLIT CONFIGURATION OPTIMIZATION

(71) Applicant: NOKIA SOLUTIONS AND NETWORKS OY, Espoo (FI)

(72) Inventors: Suresh Kalyanasundaram, Bangalore (IN); Lorenzo Maggi, Paris (FR); Deepak Kumar Nayak, Bangalore (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 76 days.

(21) Appl. No.: 18/114,329

(22) Filed: Feb. 27, 2023

(65) Prior Publication Data

US 2023/0275638 A1    Aug. 31, 2023

(30) Foreign Application Priority Data

Feb. 28, 2022   (FI) ..................... 20225181

(51) Int. Cl.
*H04B 7/06* (2006.01)
*H04B 7/0426* (2017.01)

(52) U.S. Cl.
CPC .......... *H04B 7/0632* (2013.01); *H04B 7/043* (2013.01)

(58) Field of Classification Search
CPC .... H04B 7/0632; H04B 7/043; H04B 7/0469; H04B 7/0695; H04B 7/0617; H04B 7/0413; H04B 7/0626; H04W 16/28; H04W 24/02; H04W 72/046; H04L 5/0048

USPC ......................... 375/262, 267, 299
See application file for complete search history.

(56) References Cited

U.S. PATENT DOCUMENTS

| | | | |
|---|---|---|---|
| 2009/0312044 A1* | 12/2009 | Hottinen | H04W 72/542 455/509 |
| 2015/0003325 A1* | 1/2015 | Sajadieh | H04L 5/1469 370/328 |
| 2021/0067981 A1* | 3/2021 | Nilsson | H04W 72/046 |
| 2021/0126684 A1* | 4/2021 | Chen | H04B 7/0456 |
| 2021/0195571 A1* | 6/2021 | Denis | G01S 11/04 |
| 2021/0218460 A1* | 7/2021 | Garcia | H04B 7/0695 |
| 2021/0226676 A1* | 7/2021 | Gresset | H04W 72/046 |

* cited by examiner

*Primary Examiner* — Emmanuel Bayard
(74) *Attorney, Agent, or Firm* — SQUIRE PATTON BOGGS (US) LLP

(57) ABSTRACT

Beam and antenna array split configuration optimization is disclosed. A network node device generates a beam dictionary defining a set of beams. The network node device estimates a traffic density distribution for a radio channel based on obtained channel quality information. The network node device determines, for each of at least two array split configurations associated with a transceiver antenna array of the network node device, a set of optimal beams from the beam dictionary that optimizes a utility function, based on the estimated traffic density distribution. The network node device selects an array split configuration that maximizes the utility function across a coverage area of a radio cell associated with the network node device. The network node device applies the selected array split configuration to the transceiver antenna array in response to evaluating that the selected array split configuration improves downlink performance.

15 Claims, 6 Drawing Sheets

BEAM AND ANTENNA ARRAY SPLIT CONFIGURATION OPTIMIZATION

TECHNICAL FIELD

The disclosure relates generally to communications and, more particularly but not exclusively, to beam and antenna array split configuration optimization.

BACKGROUND

In fifth generation (5G) new radio (NR) wireless networks, larger transceiver (TRX) antenna arrays may be virtualized to a smaller number of channel state information reference signal (CSI-RS) antenna ports exposed to a user equipment (UE). Typically, the UE may provide the best weights to be applied to these virtualized CSI-RS antenna ports to maximize the spectral efficiency at the user side. The weights may be chosen, e.g., from a codebook of oversampled discrete Fourier transform (DFT) beams for type-1 feedback. At least some current base stations currently use this method with eight ports and four such CSI-RS resources. The UE may choose one of the CSI-RS resources and, e.g., a corresponding precoding matrix indicator (PMI), rank indicator (RI), and/or channel quality indicator (CQI) that maximize the spectral efficiency at the UE.

However, at least in some situations an optimal antenna array split configuration and optimal beams for the CSI-RS ports may vary, e.g., from one cell to another and/or from one deployment to another. Accordingly, at least in some situations there may be a need to adapt the beams and/or the array split configuration according to the deployment and/or traffic density distribution.

SUMMARY

The scope of protection sought for various example embodiments of the invention is set out by the independent claims. The example embodiments and features, if any, described in this specification that do not fall under the scope of the independent claims are to be interpreted as examples useful for understanding various example embodiments of the invention.

An example embodiment of a network node device comprises at least one processor, at least one memory including computer program code, and a transceiver antenna array having at least two associated array split configurations. The at least one memory and the computer program code are configured to, with the at least one processor, cause the network node device at least to perform generating a beam dictionary defining a set of beams. The at least one memory and the computer program code are further configured to, with the at least one processor, cause the network node device to perform estimating a traffic density distribution for a radio channel between the network node device and a client device based on obtained channel quality information for the radio channel. The at least one memory and the computer program code are further configured to, with the at least one processor, cause the network node device to perform determining, for each of the at least two associated array split configurations, a set of optimal beams from the beam dictionary that optimizes a utility function, based on the estimated traffic density distribution. The at least one memory and the computer program code are further configured to, with the at least one processor, cause the network node device to perform selecting an array split configuration of the at least two associated array split configurations with the determined sets of optimal beams that maximizes the utility function across a coverage area of a radio cell associated with the network node device. The at least one memory and the computer program code are further configured to, with the at least one processor, cause the network node device to perform applying the selected array split configuration to the transceiver antenna array in response to evaluating that the selected array split configuration improves downlink, DL, performance over a currently used array split configuration.

In an example embodiment, alternatively or in addition to the above-described example embodiments, the utility function comprises a function of estimated received power at the client device.

In an example embodiment, alternatively or in addition to the above-described example embodiments, the function of the estimated received power at the client device comprises a function of at least one of: signal power, a signal-to-interference-plus-noise ratio, or spectral efficiency.

In an example embodiment, alternatively or in addition to the above-described example embodiments, the utility function further comprises an alpha-fairness function.

In an example embodiment, alternatively or in addition to the above-described example embodiments, the at least one memory and the computer program code are further configured to, with the at least one processor, cause the network node device to perform the determining of the set of optimal beams for each of the at least two associated array split configurations by using a dynamic programming—based optimization for optimizing the utility function.

In an example embodiment, alternatively or in addition to the above-described example embodiments, the dynamic programming—based optimization comprises a greedy algorithm configured to sequentially add beams maximizing incremental gain.

In an example embodiment, alternatively or in addition to the above-described example embodiments, the dynamic programming—based optimization comprises a policy improvement algorithm configured to iteratively choose a beam maximizing achieved performance.

In an example embodiment, alternatively or in addition to the above-described example embodiments, the estimating of the traffic density distribution comprises determining an azimuth and an elevation of at least one of an angle-of-arrival or angle-of-departure at the network node device.

In an example embodiment, alternatively or in addition to the above-described example embodiments, the estimating of the traffic density distribution further comprises determining an empirical distribution of a channel matrix of the radio channel in the determined azimuths and elevations.

In an example embodiment, alternatively or in addition to the above-described example embodiments, the obtained channel quality information comprises at least one of channel state information, CSI, measurements or sounding reference signal, SRS, measurements.

In an example embodiment, alternatively or in addition to the above-described example embodiments, the at least one memory and the computer program code are further configured to, with the at least one processor, cause the network node device to recurringly perform the traffic density distribution estimation, the determination of the set of optimal beams, the selection of the array split configuration that maximizes the utility function, the evaluating, and the applying of the selected array split configuration.

In an example embodiment, alternatively or in addition to the above-described example embodiments, the set of beams comprises at least one channel state information reference signal, CSI-RS, beam.

In an example embodiment, alternatively or in addition to the above-described example embodiments, the network node device comprises a multiple-input and multiple-output, MIMO, capable network node device.

An example embodiment of a network node device comprises means for performing: generating a beam dictionary defining a set of beams. The means are further configured to perform estimating a traffic density distribution for a radio channel between the network node device and a client device based on obtained channel quality information for the radio channel. The means are further configured to perform determining, for each of the at least two associated array split configurations, a set of optimal beams from the beam dictionary that optimizes a utility function, based on the estimated traffic density distribution. The means are further configured to perform selecting an array split configuration of the at least two associated array split configurations with the determined sets of optimal beams that maximizes the utility function across a coverage area of a radio cell associated with the network node device. The means are further configured to perform applying the selected array split configuration to the transceiver antenna array in response to evaluating that the selected array split configuration improves downlink, DL, performance over a currently used array split configuration.

In an example embodiment, alternatively or in addition to the above-described example embodiments, the utility function comprises a function of estimated received power at the client device.

In an example embodiment, alternatively or in addition to the above-described example embodiments, the function of the estimated received power at the client device comprises a function of at least one of: signal power, a signal-to-interference-plus-noise ratio, or spectral efficiency.

In an example embodiment, alternatively or in addition to the above-described example embodiments, the utility function further comprises an alpha-fairness function.

In an example embodiment, alternatively or in addition to the above-described example embodiments, the means are further configured to perform the determining of the set of optimal beams for each of the at least two associated array split configurations by using a dynamic programming—based optimization for optimizing the utility function.

In an example embodiment, alternatively or in addition to the above-described example embodiments, the dynamic programming—based optimization comprises a greedy algorithm configured to sequentially add beams maximizing incremental gain.

In an example embodiment, alternatively or in addition to the above-described example embodiments, the dynamic programming—based optimization comprises a policy improvement algorithm configured to iteratively choose a beam maximizing achieved performance.

In an example embodiment, alternatively or in addition to the above-described example embodiments, the estimating of the traffic density distribution comprises determining an azimuth and an elevation of at least one of an angle-of-arrival or angle-of-departure at the network node device.

In an example embodiment, alternatively or in addition to the above-described example embodiments, the estimating of the traffic density distribution further comprises determining an empirical distribution of a channel matrix of the radio channel in the determined azimuths and elevations.

In an example embodiment, alternatively or in addition to the above-described example embodiments, the obtained channel quality information comprises at least one of channel state information, CSI, measurements or sounding reference signal, SRS, measurements.

In an example embodiment, alternatively or in addition to the above-described example embodiments, the means are further configured to recurringly perform the traffic density distribution estimation, the determination of the set of optimal beams, the selection of the array split configuration that maximizes the utility function, the evaluating, and the applying of the selected array split configuration.

In an example embodiment, alternatively or in addition to the above-described example embodiments, the set of beams comprises at least one channel state information reference signal, CSI-RS, beam.

In an example embodiment, alternatively or in addition to the above-described example embodiments, the network node device comprises a multiple-input and multiple-output, MIMO, capable network node device.

An example embodiment of a method comprises generating, by a network node device, a beam dictionary defining a set of beams. The method further comprises estimating, by the network node device, a traffic density distribution for a radio channel between the network node device and a client device based on obtained channel quality information for the radio channel. The method further comprises determining, by the network node device, for each of at least two array split configurations associated with a transceiver antenna array of the network node device, a set of optimal beams from the beam dictionary that optimizes a utility function, based on the estimated traffic density distribution. The method further comprises selecting, by the network node device, an array split configuration of the at least two associated array split configurations with the determined sets of optimal beams that maximizes the utility function across a coverage area of a radio cell associated with the network node device. The method further comprises applying, by the network node device, the selected array split configuration to the transceiver antenna array in response to evaluating that the selected array split configuration improves downlink, DL, performance over a currently used array split configuration.

In an example embodiment, alternatively or in addition to the above-described example embodiments, the utility function comprises a function of estimated received power at the client device.

In an example embodiment, alternatively or in addition to the above-described example embodiments, the function of the estimated received power at the client device comprises a function of at least one of: signal power, a signal-to-interference-plus-noise ratio, or spectral efficiency.

In an example embodiment, alternatively or in addition to the above-described example embodiments, the utility function further comprises an alpha-fairness function.

In an example embodiment, alternatively or in addition to the above-described example embodiments, the determining of the set of optimal beams for each of the at least two associated array split configurations is performed by using a dynamic programming—based optimization for optimizing the utility function.

In an example embodiment, alternatively or in addition to the above-described example embodiments, the dynamic programming—based optimization comprises a greedy algorithm configured to sequentially add beams maximizing incremental gain.

In an example embodiment, alternatively or in addition to the above-described example embodiments, the dynamic programming—based optimization comprises a policy improvement algorithm configured to iteratively choose a beam maximizing achieved performance.

In an example embodiment, alternatively or in addition to the above-described example embodiments, the estimating of the traffic density distribution comprises determining an azimuth and an elevation of at least one of an angle-of-arrival or angle-of-departure at the network node device.

In an example embodiment, alternatively or in addition to the above-described example embodiments, the estimating of the traffic density distribution further comprises determining an empirical distribution of a channel matrix of the radio channel in the determined azimuths and elevations.

In an example embodiment, alternatively or in addition to the above-described example embodiments, the obtained channel quality information comprises at least one of channel state information, CSI, measurements or sounding reference signal, SRS, measurements.

In an example embodiment, alternatively or in addition to the above-described example embodiments, the method further comprises recurringly performing the traffic density distribution estimation, the determination of the set of optimal beams, the selection of the array split configuration that maximizes the utility function, the evaluating, and the applying of the selected array split configuration.

In an example embodiment, alternatively or in addition to the above-described example embodiments, the set of beams comprises at least one channel state information reference signal, CSI-RS, beam.

In an example embodiment, alternatively or in addition to the above-described example embodiments, the network node device comprises a multiple-input and multiple-output, MIMO, capable network node device.

An example embodiment of a computer program comprises instructions for causing a network node device to perform at least the following: generating a beam dictionary defining a set of beams; estimating a traffic density distribution for a radio channel between the network node device and a client device based on obtained channel quality information for the radio channel; determining, for each of at least two array split configurations associated with a transceiver antenna array of the network node device, a set of optimal beams from the beam dictionary that optimizes a utility function, based on the estimated traffic density distribution; selecting an array split configuration of the at least two associated array split configurations with the determined sets of optimal beams that maximizes the utility function across a coverage area of a radio cell associated with the network node device; and applying the selected array split configuration to the transceiver antenna array in response to evaluating that the selected array split configuration improves downlink, DL, performance over a currently used array split configuration.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
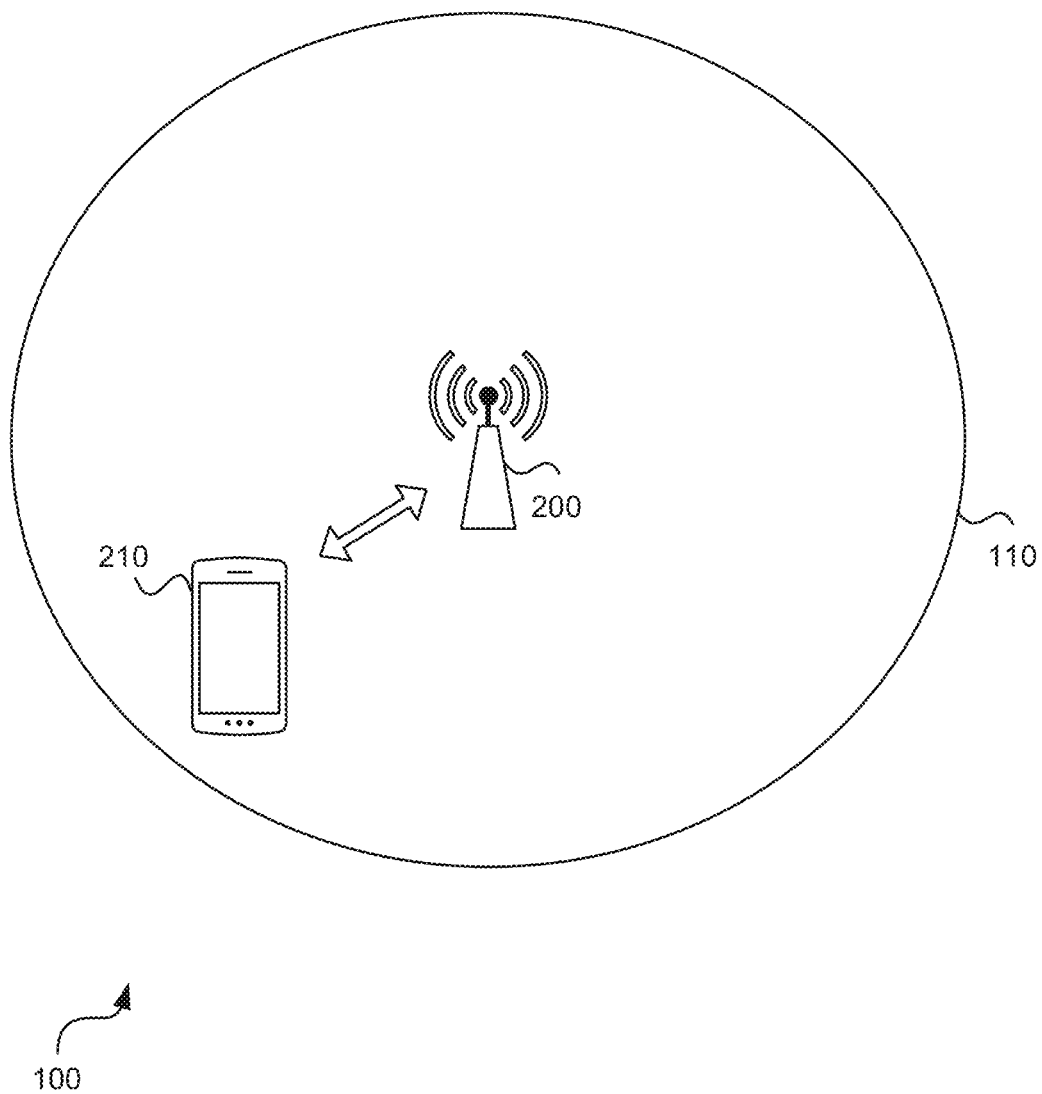
FIG. 1 shows an example embodiment of the subject matter described herein illustrating an example system, where various embodiments of the present disclosure may be implemented.

FIG. 1 illustrates an example system 100, where various embodiments of the present disclosure may be implemented. The system 100 may comprise a fifth generation (5G) new radio (NR) network 110. An example representation of the system 100 is shown depicting a client device 210 and a network node device 2000. At least in some embodiments, the 5G NR network 110 may comprise one or more massive machine-to-machine (M2M) network(s), massive machine type communications (mMTC) network(s), internet of things (IoT) network(s), industrial internet-of-things (IIoT) network(s), enhanced mobile broadband (eMBB) network(s), ultra-reliable low-latency communication (URLLC) network(s), and/or the like. In other words, the 5G NR network 110 may be configured to serve diverse service types and/or use cases, and it may logically be seen as comprising one or more networks.

The client device 210 may include, e.g., a mobile phone, a smartphone, a tablet computer, a smart watch, or any hand-held, portable and/or wearable device. The client device 210 may also be referred to as a user equipment (UE). The network node device 200 may comprise a base station. The base station may include, e.g., a fifth-generation base station (gNB) or any such device suitable for providing an air interface for client devices to connect to a wireless network via wireless transmissions.

As discussed above, in 5G NR wireless networks, larger transceiver (TRX) antenna arrays may be virtualized to a smaller number of channel state information reference signal (CSI-RS) antenna ports exposed to a user equipment (UE). Typically, the UE may provide the best weights to be applied to these virtualized CSI-RS antenna ports to maximize the spectral efficiency at the user side. The weights may be chosen, e.g., from a codebook of over-sampled discrete Fourier transform (DFT) beams for type-1 feedback. At least some current base stations currently use this method with eight ports and four such CSI-RS resources. The UE may choose one of the CSI-RS resources and, e.g., a corresponding precoding matrix indicator (PMI), rank indicator (RI), and/or channel quality indicator (CQI) that maximize the spectral efficiency at the UE.

Figure 3A:
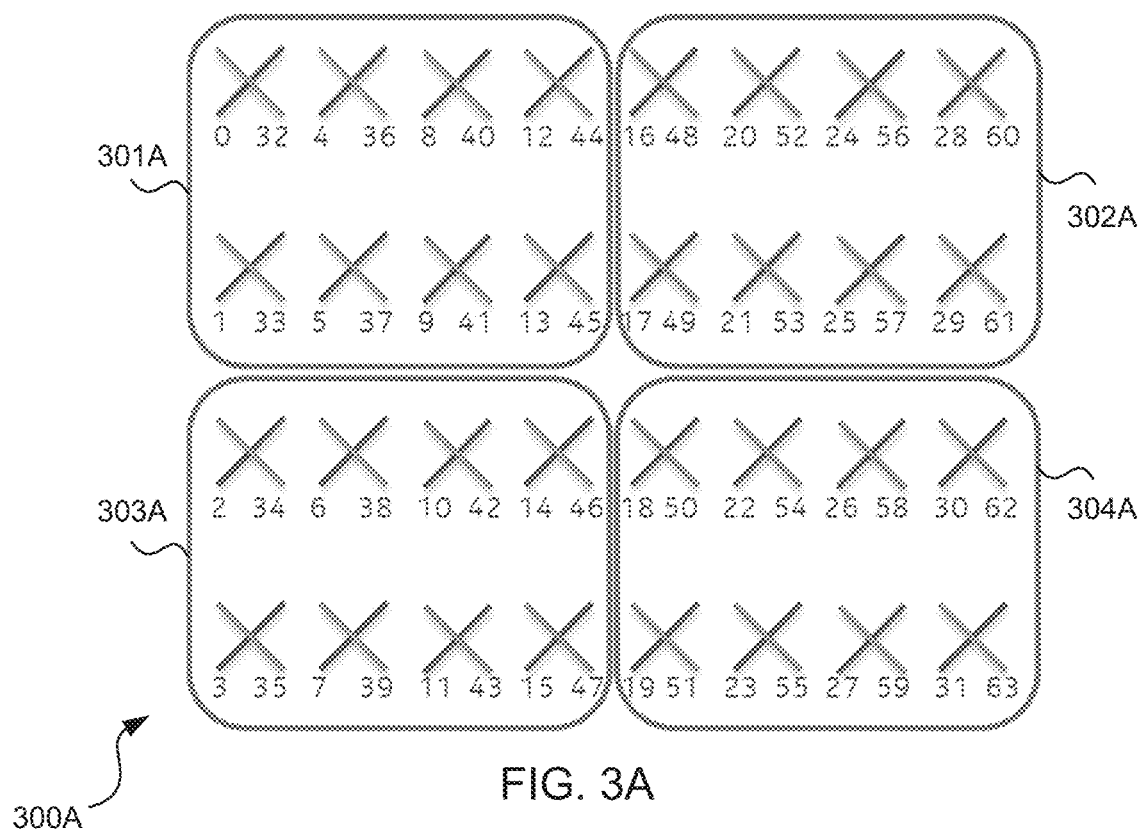
FIG. 3A illustrates an example of how a 64 TRX antenna array may be virtualized into 8 CSI-RS ports for a 2×2 array split configuration.
Figure 3B:
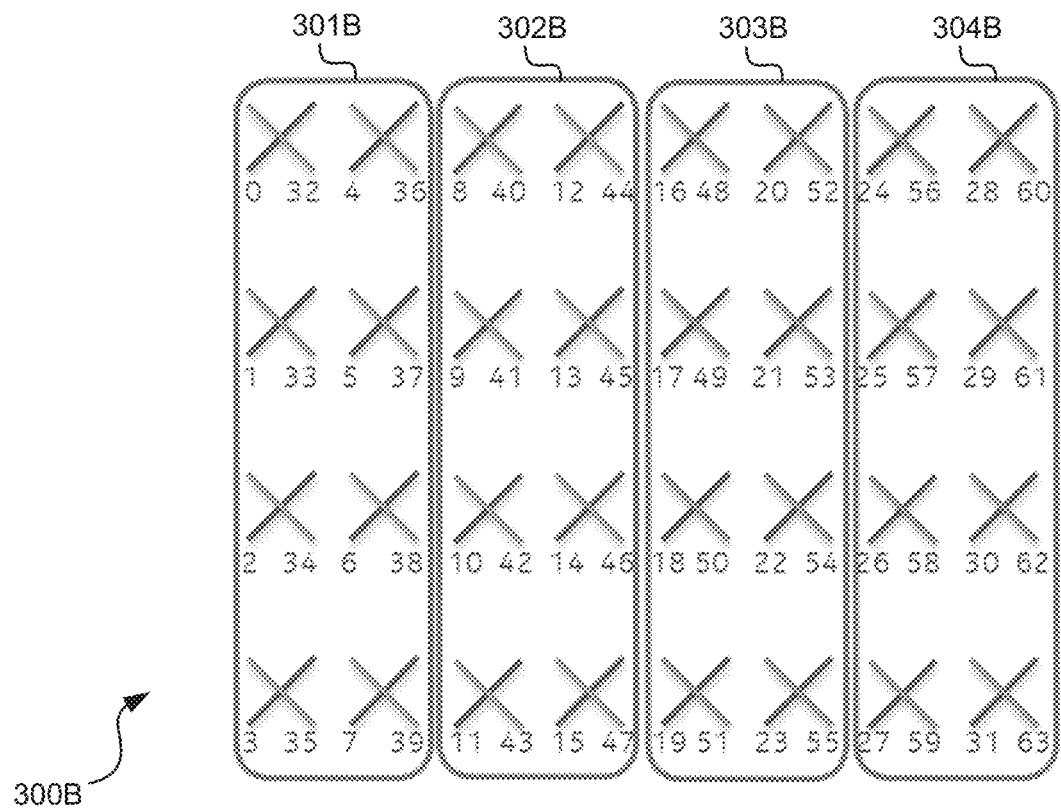
FIG. 3B illustrates an example of how a 64 TRX antenna array may be virtualized into 8 CSI-RS ports for a 4×1 array split configuration.

Diagram 300A of FIG. 3A illustrates an example of how a 64 TRX antenna array may be virtualized into 8 CSI-RS ports for a 2×2 array split configuration, and diagram 300B of FIG. 3B illustrates an example of how a 64 TRX antenna array may be virtualized into 8 CSI-RS ports for a 4×1 array split configuration. That is, diagram 300A shows antenna arrays 301A-304A that are split into a 2×2 configuration, and diagram 300B shows antenna arrays 301B-304B that are split into a 4×1 configuration. In FIGS. 3A and 3B, each cross-like symbol represents two cross-polarized CSI-RS antenna ports. The two numbers below each pair of the cross-polarized CSI-RS antenna ports represent respective example weights.

For the case of a 64 TRX radio with antennas laid out in an 8×8×2 configuration, 8 TRXs may be utilized to form a CSI-RS port, and these 8 TRXs may be created by a split panel configuration. The weights applied to these 8 TRXs that go into creating a CSI-RS port may be up to a network node device (such as a gNB) to decide. There may be, e.g., two configurations for the case of 8 CSI-RS ports on which 8 TRXs go into creating a CSI-RS port, i.e., a so-called 2×2 array split configuration and a 4×1 array split configuration.

As also discussed above, at least in some situations an optimal antenna array split configuration and optimal beams for the CSI-RS ports may vary, e.g., from one cell to another and/or from one deployment to another. Accordingly, at least in some situations there may be a need to adapt the beams and/or the array split configuration according to the deployment and/or traffic density distribution. In other words, at least in some situations there may be a need to be able to decide which of the array split configurations is optimal for a given deployment/cell/traffic density distribution and the right beams to be deployed for the chosen array split configuration to create the different CSI-RS resources (or so-called CSI-RS resource indicator (CRI) beams), based on measurements from the client device 210.

In the following, various example embodiments will be discussed. At least some of these example embodiments may allow designing the beams that go into creating the CSI-RS ports, and the optimal array split configuration such that an appropriate utility/throughput metric is optimized in a given cell. This optimization may be done based on client device 210 measurement reports that may give at least a rough estimate of the traffic density distribution within a cell. Such measurements may come from CSI reports and/or SRS measurements performed at the network node device 200. A combination of this information may be used to estimate the traffic density distribution.

As will be discussed in more detail below, the client device 210—reported CSI measurements or SRS measurements made at the network node device 200 may be utilized to reconstruct a best estimate of the radio channel from/to the client device 210. This may then be converted into a traffic density map denoted by $\rho$ that may provide at least a rough distribution of the traffic density in azimuth and elevation angles of arrivals/angles of departures. Based on this traffic density, the array split configuration and the beam weights applied to the TRXs may be optimized to create, e.g., up to four CSI-RS beams to maximize a sum-utility across, e.g., an entire coverage area of a cell.

Figure 2:
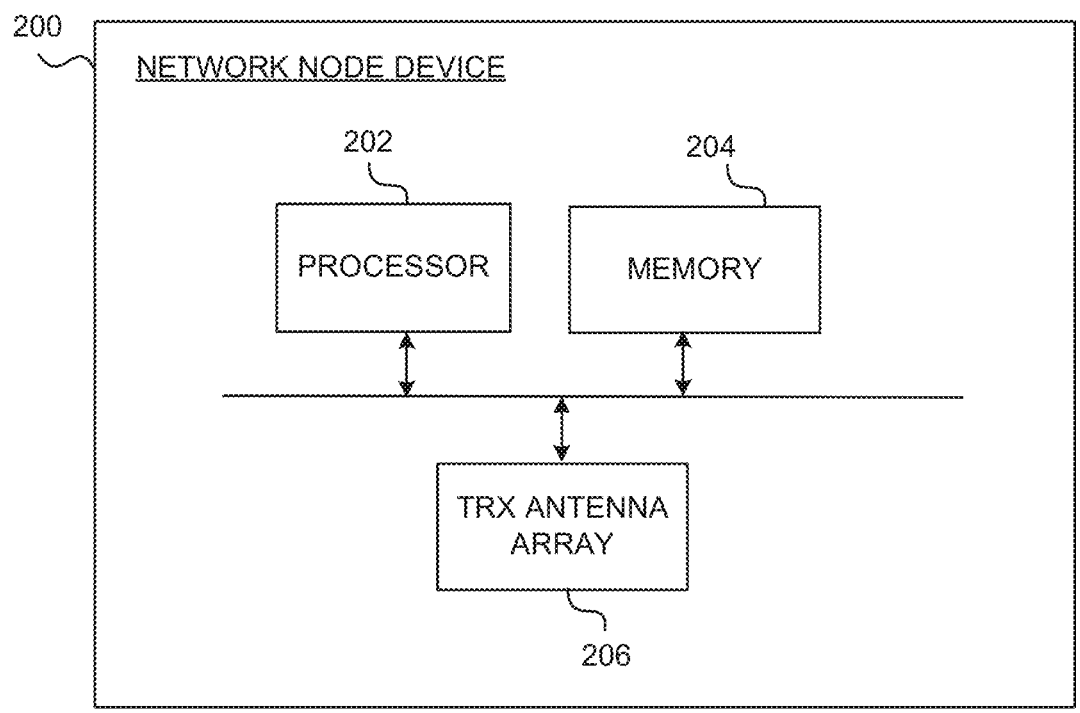
FIG. 2 shows an example embodiment of the subject matter described herein illustrating a network node device.

FIG. 2 is a block diagram of a network node device 200, in accordance with an example embodiment.

The network node device 200 comprises at least one processor 202 and at least one memory 204 including computer program code. The network node device 200 further comprises a transceiver antenna array 206 having at least two associated array split configurations.

The network node device 200 may also include other elements, such as a transceiver configured to enable the network node device 200 to transmit and/or receive information to/from other devices, as well as other elements not shown in FIG. 2. In one example, the network node device 200 may use the transceiver to transmit or receive signaling information and data in accordance with at least one cellular communication protocol. The transceiver may be configured to provide at least one wireless radio connection, such as for example a 3GPP mobile broadband connection (e.g., 5G). The transceiver may be configured to be coupled to at least one antenna of the transceiver antenna array 206 to transmit and/or receive radio frequency signals.

Although the network node device 200 is depicted to include only one processor 202, the network node device 200 may include more processors. In an embodiment, the memory 204 is capable of storing instructions, such as an operating system and/or various applications. Furthermore, the memory 204 may include a storage that may be used to store, e.g., at least some of the information and data used in the disclosed embodiments.

Furthermore, the processor 202 is capable of executing the stored instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as semiconductor memories (such as mask ROM, PROM (programmable ROM), EPROM (erasable PROM), flash ROM, RAM (random access memory), etc.).

The network node device 200 may comprise a base station. The base station may include, e.g., a fifth-generation base station (gNB) or any such device providing an air interface for client devices to connect to the wireless network via wireless transmissions. At least in some embodiments, the network node device 200 may comprise a multiple-input and multiple-output (MIMO) capable network node device.

The at least one memory 204 and the computer program code are configured to, with the at least one processor 202, cause the network node device 200 at least to perform generating a beam dictionary defining a set of beams (or beam set). For example, the set of beams may comprise at least one channel state information reference signal (CSI-RS) beam.

Figure 4A:
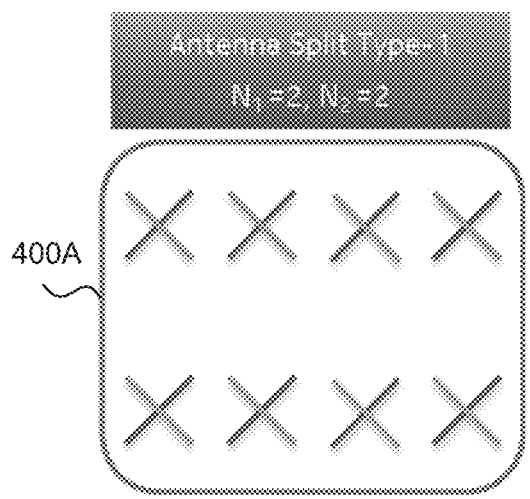
FIGS. 4A and 4B show an example embodiment of the subject matter described herein illustrating creating cross-polarized CSI-RS ports.
Figure 4B:
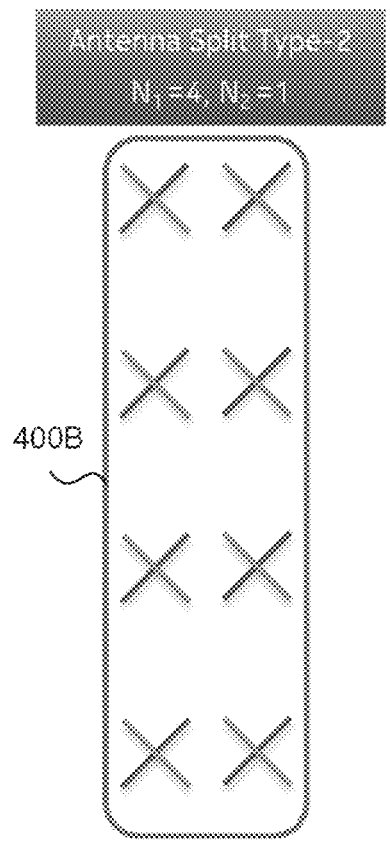

In other words, the beam dictionary may be created for each of the array split configuration types for the set of TRXs that are virtualized into a single antenna port seen by the client device 210. For an 8-port and 64 TRX case with the antenna array laid out as a 4×8×2 array, examples of the TRXs that go into creating a pair of cross-polarized CSI-RS ports for the 2×2 array split configuration and the 4×1 array split configuration are illustrated with antenna array 400A in FIG. 4A and antenna array 400B in FIG. 4B, respectively. Again, each cross-like symbol represents two cross-polarized CSI-RS antenna ports.

Figure 5:
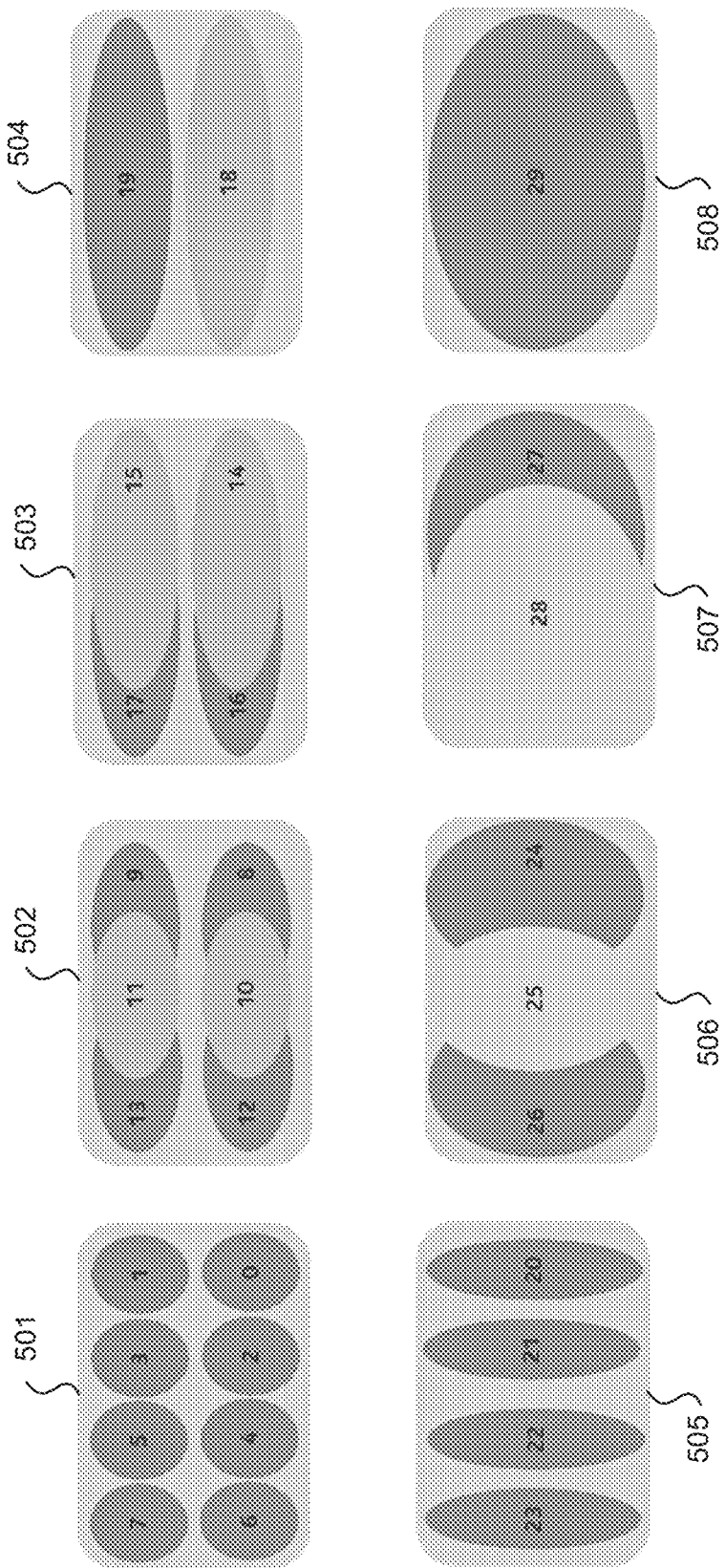
FIG. 5 shows an example embodiment of the subject matter described herein illustrating a beam set dictionary for a 2×2 array split configuration with different beam widths.

The beam dictionary may be created by including a large number of beams with different beam widths and different beam pointing directions. This allows the beam optimizing to choose the right set of beams to optimize performance. Example sets 501-508 of beams that may be created for the 2×2 array split configuration are shown in FIG. 5, in which examples of different beam widths are also illustrated. In addition, these beams may be over-sampled with more fine-grained beam pointing directions to realize a larger set of beams to achieve large performance gains. The numbers inside the beam sets 501-508 represent example identifiers of the respective beams.

The at least one memory 204 and the computer program code are further configured to, with the at least one processor 202, cause the network node device 200 to perform estimating a traffic density distribution for a radio channel between the network node device 200 and a client device 210 based on obtained channel quality information for the radio channel. For example, the obtained channel quality information may comprise channel state information (CSI) measurements or sounding reference signal (SRS) measurements.

For example, the estimating of the traffic density distribution may comprise determining an azimuth and an elevation of at least one of an angle-of-arrival or angle-of-departure at the network node device 200. The estimating of the traffic density distribution may further comprise determining an empirical distribution of a channel matrix of the radio channel in the determined azimuths and elevations.

In other words, the traffic density p may be estimated using the client device 210—reported CSI information, or best beam information, or using SRS measurements made at the network node device 200. Based on this information, it is possible to determine the azimuth and elevation angle of the angle-of-arrival and/or angle-of-departure at the network node device 200, and based on the number of such measurements in a quantized azimuth and elevation angle space, it is possible to determine an empirical distribution of how the client devices 210 are spread out in elevation and azimuth angles. This may be viewed as estimating the channel matrix H given in Eq. (1) below, and determining an empirical distribution on H, or equivalently the azimuth and elevation angles.

The at least one memory 204 and the computer program code are further configured to, with the at least one processor 202, cause the network node device 200 to perform determining, for each of the at least two associated array split configurations, a set of optimal beams from the beam dictionary that optimizes a utility function, based on the estimated traffic density distribution. For example, the utility function may comprise a function of estimated received power at the client device 210. Such a function of the estimated received power at the client device 210 may comprise, e.g., a function of: signal power, a signal-to-interference-plus-noise ratio (SINR), and/or spectral efficiency. At least in some embodiments, the utility function may further comprise an alpha-fairness function.

In other words, at least in some embodiments, the above optimization may be expressed as follows:

$$\max_{s=1,2} \max_{W_{CRI}^{(s)*} \subset \{W_{CRI}^s\}} \sum_u \rho(u) \max_{W_{CRI,k} \in W_{CRI}^{(s)*}} U\left(\left\|\widehat{H_u} W_{CRI,k} v_{PMI,q_k(u)}\right\|^2\right) \quad (1)$$

$$\text{with } v_{PMI,q_k(u)} = \arg \max_{v_{PMI,q} \in \{v_{PMI}\}} U\left(\left\|H_u W_{CRI,k} v_{PMI,q}\right\|^2\right)$$

in which the following notations are used.

ρ(u) is the traffic density estimated at a spatial unit/position u, estimating the average amount of traffic generated at the position u. This serves the purpose of prioritizing geographical areas with more traffic while optimizing beamforming.

$\{W_{CRI}^s\}$ is the set of beams in the beam dictionary for, e.g., two array split configuration types: s=1 (2×2 array split configuration) and s=2 (4×1 array split configuration) from which to pick a set of four beams to be included in an optimal CRI beam set.

$W_{CRI}^{(s)*}$ is a chosen optimal 4-beam subset of $\{W_{CRI}^s\}$ for an array split configuration s.

$W_{CRI,k}$ is a beamforming matrix corresponding to a CRI resource k. $W_{CRI,k}$ is of dimensions #TRXs×#CSI–RS ports of the following form:

$$W_{CRI,k} = \begin{pmatrix} W_1 & 0 & \cdots & 0 \\ 0 & W_2 & \cdots & 0 \\ \vdots & \vdots & \ddots & 0 \\ 0 & 0 & 0 & W_{CSI-RS\ ports} \end{pmatrix}$$

with $W_i$ of dimensions $$\frac{\#TRXs}{CSI - RS\ \text{ports}} \times 1$$

being the CSI-RS ports weights used for creating the i-th CSI-RS port. It uses a mutually exclusive set of TRXs from TRX #

$$(i-1) \times \frac{\#TRXs}{CSI - RS\ \text{ports}} + 1 \text{ to } i \times \frac{\#TRXs}{CSI - RS\ \text{ports}}.$$

$\{v_{PMI}\}$ is a set of available precoding vectors of a precoding matrix of a reported PMI (associated with the strongest layer LI), of dimensions #CSI–RS ports× 1.

$v_{PMI,q}$ is a particular precoding matrix.

$v_{PMI,q_k(u)}$ is a preferred precoding matrix for a user in a position u given that beam $W_{CRI,k}$ is employed.

$\widehat{H_u}$ is the estimated channel matrix for a client device 210 located in u, of a size [$n_R$×#TRXs], where $n_R$ is the number of antennas or the number of layers, depending on how the channel is estimated. The channel may be estimated, e.g., from the CSI report of the client device 210, or from the SRS transmissions of the client device

210, which may be, e.g., codebook SRS transmissions or antenna switching SRS transmissions. If the channel is estimated using the CSI reports, then $n_R$ may be, e.g., the number of DL layers reported by the client device 210. If the channel is estimated using codebook SRS transmissions, then $n_R$ may be, e.g., the number of transmit antennas of the client device 210, and if the channel is estimated using antenna switching SRS transmissions, then $n_R$ may be, e.g., the number of receive antennas at the client device 210.

$U(\cdot)$ is the utility function that may provide the utility, e.g., as a function of estimated received power at the client device 210. The utility functions may include, e.g., the SINR, or the spectral efficiency, e.g., from a modification of Shannon's capacity formula to account for practical implementation losses, such as a quantized modulation and coding scheme (MCS), non-ideal link adaptation, etc. At least in some embodiments, the signal power may be used as the optimization metric, i.e., $U(x_u)=x_u$.

To ensure fairness across client devices 210 in different positions u, utility $U(x_u)$ may be combined with the alpha-fairness function $f^\alpha$, defined as:

$$f^\alpha(U(x_u)) = \begin{cases} (1-\alpha)^{-1} U(x_u)^{1-\alpha}, & \text{if } \alpha \neq 1 \\ \log(U(x_u)), & \text{if } \alpha = 1 \end{cases} \quad (4)$$

In which different values of a correspond to different utility metrics:
$\alpha=0 \rightarrow$ sum-utility
$\alpha=1 \rightarrow$ geometric mean
$\alpha=\infty \rightarrow$ max-min fairness≈maximum coverage
$1<\alpha<\infty$ anything "in-between".

When used with $U(x_u)$ as the throughput of the user located in u, the above alpha-fairness function yields a proportional fairness metric that may be used to optimize system performance.

At least in some embodiments, the at least one memory 204 and the computer program code may be further configured to, with the at least one processor 202, cause the network node device 200 to perform the determining of the set of optimal beams for each of the at least two associated array split configurations by using a dynamic programming—based optimization for optimizing the utility function. For example, the dynamic programming—based optimization may comprise a greedy algorithm configured to sequentially add beams maximizing incremental gain. Alternatively/additionally, the dynamic programming—based optimization may comprise a policy improvement algorithm configured to iteratively choose a beam maximizing achieved performance.

More specifically, the policy improvement algorithm may be configured to, e.g., iteratively select the beams at subsequent steps and use the greedy algorithm as a sub-routine. At each step, given that a set B of beams has already been selected, the policy improvement algorithm may select the beams b that maximize the utility of the beam set obtained by adding the beam b to B and then following with the greedy algorithm that sequentially adds beams maximizing an incremental gain, until a full beam set is obtained.

In other words, machine learning (ML)-based beam set optimization may be implemented, using, e.g., policy improvement and/or other dynamic programming techniques for each of the array split configurations. That is, given the estimated traffic density distribution, dynamic programming techniques (discussed below) may be used to determine the optimal set of beams from the beam dictionary that optimizes the objective in Eq. (1). At least in some embodiments, for the 8-port case, four CSI-RS beams may be used, and the client device 210 may pick the best beam among these four that maximizes the spectral efficiency (SE) at the client device 210. This may be done separately for each of the array split configurations 2×2 and 4×1.

As discussed above, the dynamic programming—based optimization may comprise a greedy algorithm. For example, an antenna array split configuration s={1,2} is to be used. In this case, the objective function (or utility function) in Eq. (1) is submodular, i.e., an additional gain brought by adding one beam to an initial beam set B decreases as B enlarges. For submodular problems, a greedy algorithm that sequentially adds a beam maximizing the incremental gain has tight performance guarantees. More specifically, the optimality gap is 1/e).

In more detail, with $$g(B) = \sum_u \rho(u) \max_{W_{CRI,k} \in B} U\left(\left\|H_u W_{CRI,k} v_{PMI,q_k(u)}\right\|^2\right)$$

representing the performance of a beam set B under array split configuration s, an example of the greedy algorithm may comprise, e.g.:

1) start with an empty beam set B=∅,
2) compute $$b^* = \arg\max_b g(B \cup b) - g(B)$$

(the beam achieving highest performance incremental gain), and 3) add b* to B and continue until B has a desired size (e.g., 4).

At least some greedy algorithms may have low complexity (in the order of O(beamset size×dictionary size)) and may run in a few tens of milliseconds in realistic scenarios.

As discussed above, the dynamic programming—based optimization may comprise a policy improvement algorithm. At least some policy improvement algorithms may build on top of the greedy algorithm and improve its performance, thereby allowing achieving an improved complexity vs. performance trade-off.

For example, Q(B,b) may be defined as the performance achieved by starting from a beam set B, adding beam b and then completing the beam set (up to the wanted size, e.g., 4) by the above greedy algorithm. Then, the policy improvement algorithm may prescribe to choose the beam b maximizing Q in an iterative fashion.

In more detail, an example of the policy improvement algorithm may comprise, e.g.:

1) start with the empty beam set B=∅,
2) compute $$b^* = \arg\max_b Q(B, b),$$

and
3) add b* to B and continue until B has the wanted size (e.g., 4).

At least in some embodiments, the performance of the policy-improvement algorithm may be superior to that of the greedy algorithm. On the other hand, the complexity of the policy-improvement algorithm is higher than that of the greedy algorithm (in fact, the greedy algorithm is a subroutine of the policy-improvement algorithm), being in the order of $O((\text{beamset size})^2 \times (\text{dictionary size})^2)$. However, in realistic scenarios, the policy-improvement algorithm may be able to provide a solution in around one minute. This is affordable, since the beam set needs only to be recomputed when the traffic density is deemed to have changed considerably, which may occur on a longer time scale (e.g., hours).

The at least one memory 204 and the computer program code are further configured to, with the at least one processor 202, cause the network node device 200 to perform selecting an array split configuration of the at least two associated array split configurations with the determined sets of optimal beams that maximizes the utility function across a coverage area of a radio cell associated with the network node device 200.

In other words, choosing the array split configuration that optimizes the performance may comprise: after having determined the optimal beam set for each of the array split configurations, the value of the objective function for each of the array split configurations may be determined, and that array split configuration $s \in \{1,2\}$ may be chosen that maximizes the objective function value.

The at least one memory 204 and the computer program code are further configured to, with the at least one processor 202, cause the network node device 200 to perform applying the selected array split configuration to the transceiver antenna array 206 in response to evaluating that the selected array split configuration improves downlink, DL, performance over a currently used array split configuration.

In other words, evaluating the performance benefits and deploying the new beam set may comprise: the objective function of the new beam set and array split configuration may be evaluated against that of the currently deployed beam set and array split configuration, and, if the gains are more than a certain threshold, then the new beam set and array split configuration may be deployed, e.g., in a closed-loop automated fashion.

At least in some embodiments, the at least one memory 204 and the computer program code may be further configured to, with the at least one processor 202, cause the network node device 200 to recurringly perform the traffic density distribution estimation, the determination of the set of optimal beams, the selection of the array split configuration that maximizes the utility function, the evaluating, and the applying of the selected array split configuration.

In other words, the traffic density distribution estimation, the determination of the set of optimal beams, the selection of the array split configuration that maximizes the utility function, the evaluating, and the applying of the selected array split configuration may be executed on a continuous basis to evaluate whether a new beam set and/or changing of the array split configuration may provide sufficient gains for the currently prevailing traffic density distribution, and accordingly deploy the new beam set and/or array split configuration.

It is be understood, that while the above description mostly used the creation of four CSI-RS beams as an example, the same approach may also be used for the creation of two CSI-RS beams or even a single CSI-RS beams for client devices 210 that have limited CSI-RS capabilities. Similarly, this approach may also be used for a case of 16/32 CSI-RS ports, for example.

Figure 6:
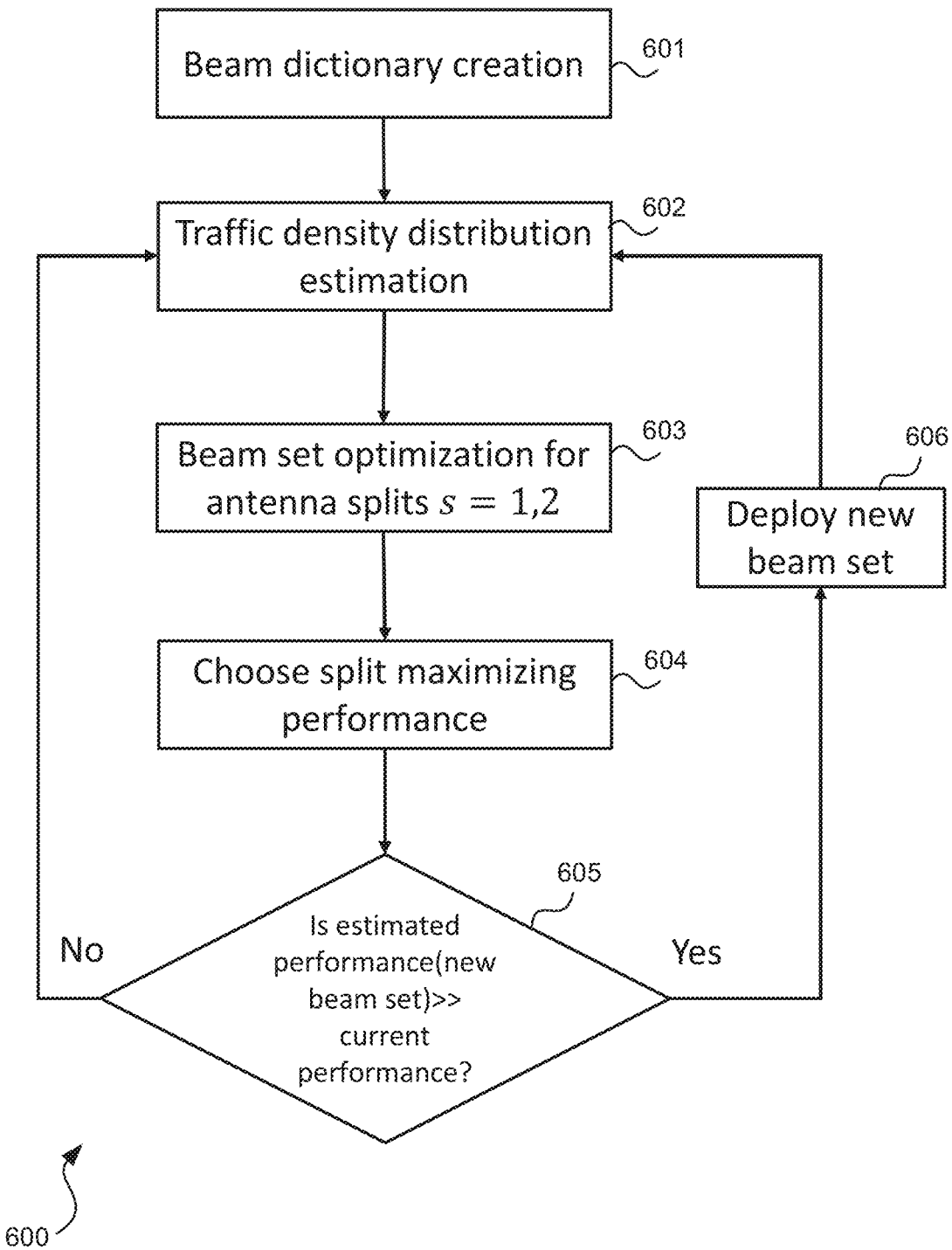
FIG. 6 shows an example embodiment of the subject matter described herein illustrating a method.

FIG. 6 illustrates an example flow chart of a method 600, in accordance with an example embodiment.

At operation 601, the network node device 200 generates a beam dictionary defining a set of beams.

At operation 602, the network node device 200 estimates a traffic density distribution for a radio channel between the network node device 200 and the client device 210 based on obtained channel quality information for the radio channel.

At operation 603, the network node device 200 determines, for each of at least two array split configurations associated with the transceiver antenna array 206 of the network node device 200, a set of optimal beams from the beam dictionary that optimizes a utility function, based on the estimated traffic density distribution.

At operation 604, the network node device 200 selects an array split configuration of the at least two associated array split configurations with the determined sets of optimal beams that maximizes the utility function across a coverage area of a radio cell associated with the network node device 200.

At operation 605, the network node device 200 evaluates whether the selected array split configuration improves DL performance over a currently used array split configuration.

At operation 606, the network node device 200 applies the selected array split configuration to the transceiver antenna array in response to evaluating at operation 605 that the selected array split configuration improves the DL performance over the currently used array split configuration.

The operations of the traffic density distribution estimation 602, the determination 603 of the set of optimal beams, the selection 604 of the array split configuration that maximizes the utility function, the evaluating 605, and the applying 606 of the selected array split configuration may be performed recurringly, as shown in FIG. 6.

The method 600 may be performed by the network node device 200 of FIG. 2. The operations 601-606 can, for example, be performed by the at least one processor 202 and the at least one memory 204. Further features of the method 600 directly result from the functionalities and parameters of the network node device 200, and thus are not repeated here. The method 800 can be performed by computer program(s).

At least some of the embodiments described herein may allow beam and antenna array split configuration optimization. More specifically, at least some of the embodiments described herein may allow adapting the beams and/or the array split configuration according to the deployment and/or traffic density distribution.

At least some of the embodiments described herein may not need to rely on any simulation environment. Rather, the beams may be computed based on actual measurements.

At least some of the embodiments described herein may allow improving DL throughput performance.

The network node device 200 may comprise means for performing at least one method described herein. In an example, the means may comprise the at least one processor 202, and the at least one memory 204 including program code configured to, when executed by the at least one processor 202, cause the network node device 200 to perform the method.

The functionality described herein can be performed, at least in part, by one or more computer program product components such as software components. According to an embodiment, the network node device 200 may comprise a processor or processor circuitry, such as for example a microcontroller, configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A network node device, comprising:
   at least one processor;
   at least one memory including computer program code; and
   a transceiver antenna array having at least two associated array split configurations;
   the at least one memory and the computer program code configured to, with the at least one processor, cause the network node device at least to perform:
   generating a beam dictionary defining a set of beams;
   estimating a traffic density distribution for a radio channel between the network node device and a client device based on obtained channel quality information for the radio channel;
   determining, for each of the at least two associated array split configurations, a set of optimal beams from the beam dictionary that optimizes a utility function, based on the estimated traffic density distribution;
   selecting an array split configuration of the at least two associated array split configurations with the determined sets of optimal beams that maximizes the utility function across a coverage area of a radio cell associated with the network node device; and
   applying the selected array split configuration to the transceiver antenna array in response to evaluating that the selected array split configuration improves downlink performance over a currently used array split configuration.

2. The network node device according to claim 1, wherein the utility function comprises a function of estimated received power at the client device.

3. The network node device according to claim 2, wherein the function of the estimated received power at the client device comprises a function of at least one of: signal power, a signal-to-interference-plus-noise ratio, or spectral efficiency.

4. The network node device according to claim 2, wherein the utility function further comprises an alpha-fairness function.

5. The network node device according to claim 1, wherein the at least one memory and the computer program code are further configured to, with the at least one processor, cause the network node device to perform the determining of the set of optimal beams for each of the at least two associated array split configurations by using a dynamic programming-based optimization for optimizing the utility function.

6. The network node device according to claim 5, wherein the dynamic programming-based optimization comprises a greedy algorithm configured to sequentially add beams maximizing incremental gain.

7. The network node device according to claim 5, wherein the dynamic programming-based optimization comprises a policy improvement algorithm configured to iteratively choose a beam maximizing achieved performance.

8. The network node device according to claim 1, wherein the estimating of the traffic density distribution comprises determining an azimuth and an elevation of at least one of an angle-of-arrival or angle-of-departure at the network node device.

9. The network node device according to claim 8, wherein the estimating of the traffic density distribution further comprises determining an empirical distribution of a channel matrix of the radio channel in the determined azimuths and elevations.

10. The network node device according claim 1, wherein the obtained channel quality information comprises at least one of channel state information measurements or sounding reference signal (SRS) measurements.

11. The network node device according to claim 1, wherein the at least one memory and the computer program code are further configured to, with the at least one processor, cause the network node device to recurringly perform the traffic density distribution estimation, the determination of the set of optimal beams, the selection of the array split configuration that maximizes the utility function, the evaluating, and the applying of the selected array split configuration.

12. The network node device according claim 1, wherein the set of beams comprises at least one channel state information reference signal (CSI-RS) beam.

13. The network node device according to claim 1, wherein the network node device comprises a multiple-input and multiple-output (MIMO) capable network node device.

14. A method, comprising:
generating, by a network node device, a beam dictionary defining a set of beams;
estimating, by the network node device, a traffic density distribution for a radio channel between the network node device and a client device based on obtained channel quality information for the radio channel;
determining, by the network node device, for each of at least two array split configurations associated with a transceiver antenna array of the network node device, a set of optimal beams from the beam dictionary that optimizes a utility function, based on the estimated traffic density distribution;
selecting, by the network node device, an array split configuration of the at least two associated array split configurations with the determined sets of optimal beams that maximizes the utility function across a coverage area of a radio cell associated with the network node device; and
applying, by the network node device, the selected array split configuration to the transceiver antenna array in response to evaluating that the selected array split configuration improves downlink (DL) performance over a currently used array split configuration.

15. A non-transitory computer-readable medium comprising instructions encoded thereon which cause a network node device to perform at least:
generating a beam dictionary defining a set of beams;
estimating a traffic density distribution for a radio channel between the network node device and a client device based on obtained channel quality information for the radio channel;
determining, for each of at least two array split configurations associated with a transceiver antenna array of the network node device, a set of optimal beams from the beam dictionary that optimizes a utility function, based on the estimated traffic density distribution;
selecting an array split configuration of the at least two associated array split configurations with the determined sets of optimal beams that maximizes the utility function across a coverage area of a radio cell associated with the network node device; and
applying the selected array split configuration to the transceiver antenna array in response to evaluating that the selected array split configuration improves downlink (DL), performance over a currently used array split configuration.

* * * * *